May 19, 1970

T. H. MURPHY ET AL 3,512,370

COMBINED LIQUID GAS-MECHANICAL FREEZING PROCESS
AND APPARATUS THEREFOR

Filed March 14, 1967

Tom H. Murphy and Don E. Tucker, INVENTORS.

BY

ATTORNEY.

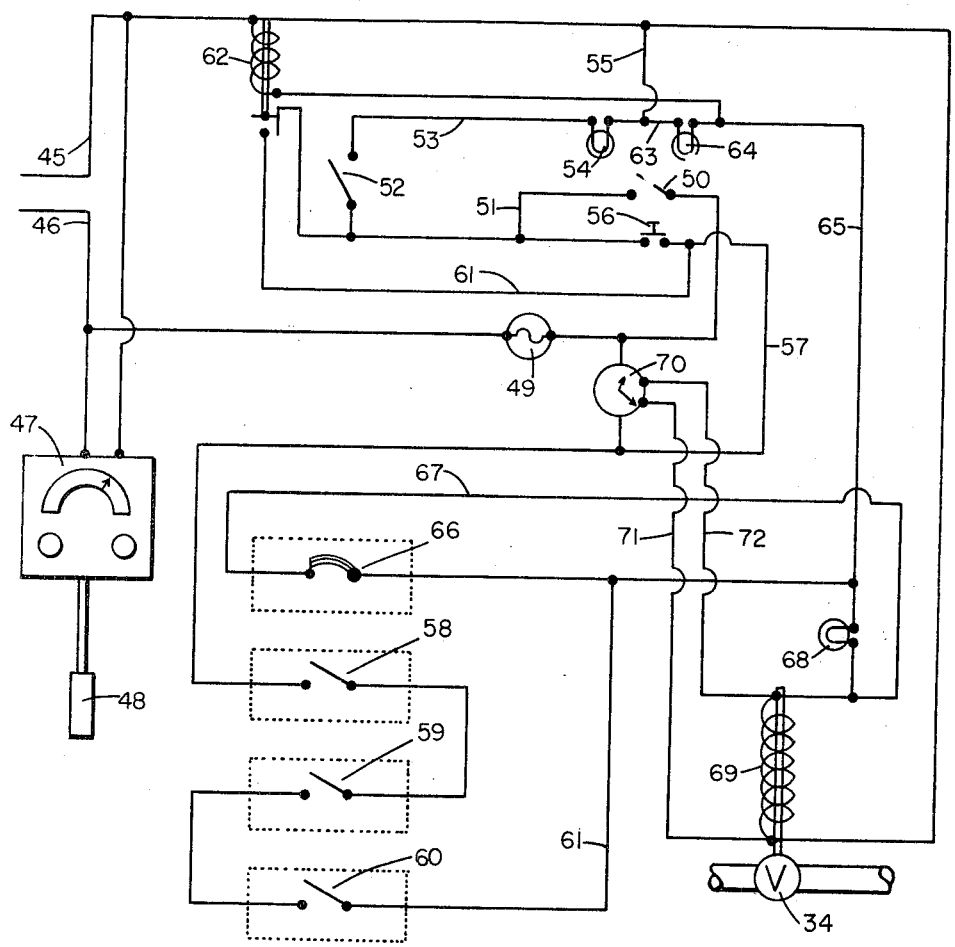
FIGURE 2
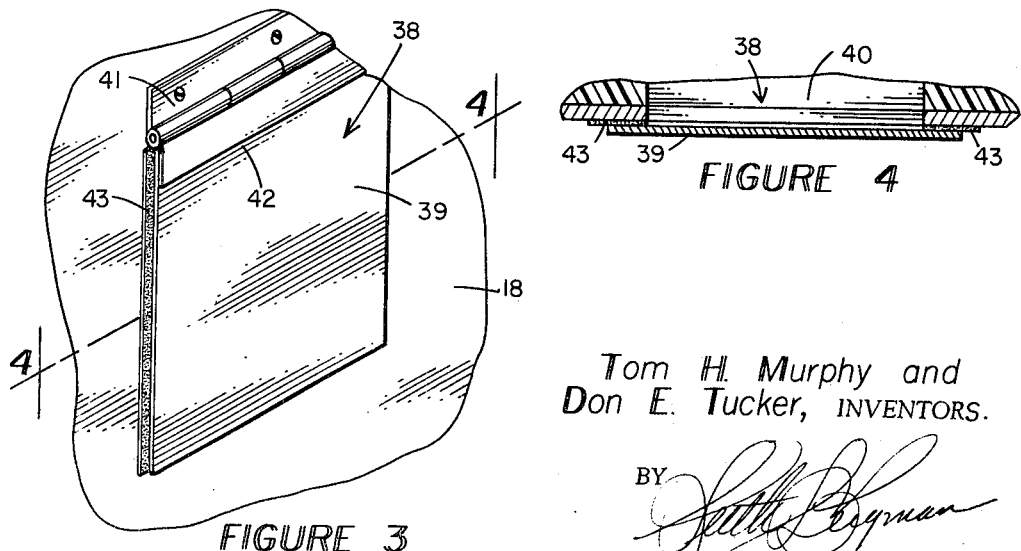
FIGURE 4
FIGURE 3
Tom H. Murphy and
Don E. Tucker, INVENTORS.
BY 
ATTORNEY.

United States Patent Office 3,512,370
Patented May 19, 1970

3,512,370
**COMBINED LIQUID GAS-MECHANICAL FREEZ-
ING PROCESS AND APPARATUS THEREFOR**
Tom H. Murphy, N. 8616 Country Homes Blvd. 99208,
and Don E. Tucker, 10515 Sinto Ave. 99206, both of
Spokane, Wash.
Filed Mar. 14, 1967, Ser. No. 669,632
Int. Cl. F25d 3/10
U.S. Cl. 62—64                             5 Claims

ABSTRACT OF THE DISCLOSURE

Cryogenic process of freezing food products in an inert atmosphere by combined liquid gas and mechanical refrigeration including lowering of product temperature near its freezing point, rapid freezing thereof and continued lowering of product temperature to the desired terminal point. The process reduces product deterioration by both chemical and physical courses principally because of the inert atmosphere preventing oxidative changes, and the rapid freezing preventing larger crystal formation. Particular appaaratus is taught to accomplish the process.

---

This invention relates generally to a freezing process using a particular combination of liquified inert gas and mechanical refrigeration, and more particularly to such a process, and the apparatus therefor, that maintains the economic benefits of mechanical cryogenics while providing the inert atmosphere and extremely low temperature associated with liquified gas.

The freezing of food products by heat transfer means associated with mechanical refrigeration, in various fashions, has been practiced for a long time. The nature of the process, however, has certain physical limitations necessarily associated with it that have been found to create non-desirable conditions in some frozen products. Principal among these is the time required to freeze the product, especially when it be amassed as is generally done in processing, and the exposure of the product during this freezing period to oxygen of the atmosphere. These conditions cause a breakdown in cell structure with associated physical and chemical changes that, although they do not normally render the product non-edible, do detract materially from its desirability.

In recent years with the commercial availability of greater quantities of liquified gas and the lowering in price of the product, various processes of freezing by this means have evolved. These processes can admirably provide an inert atmosphere, especially in the case of nitrogen. By reason of its boiling point being substantially below that of ordinary mechanical refrigerants and because of the possibilities of much more effective heat transfer, even to the extent of physically intermingling cryogen with product if necessary, this gas provides potentiality of extremely rapid freezing which either completely eliminates cellular deterioration problems and many of the other associated physical and chemical ones, or else materially lessens them. But, notwithstanding the by-products status of nitrogen, it is still an expensive refrigerant when considered in light of the ratio of heat units per dollar cost and compared to mechanical refrigeration.

With this background and information in mind, the instant invention seeks to provide a freezing process, and the apparatus for it, that combines the advantageous features of both the mechanical and liquified gas processes in a combination with the mechanical system being used where its economy is a major factor and the liquified gas system being used where its freezing characteristics are most desirable. In so doing, it is:

A principal object of our invention to provide a cryogenic process combining the economical properties of mechanical refrigeration with the low temperature of the liquified gas process.

A further object of our invention to provide a cryogenic process of the nature aforesaid that provides an atmosphere of inert gas about the product being frozen, eliminating substantially all of the oxygen which might react with the product and all moisture that might ice the refrigeration coils.

A further object of our invention to provide a process of the nature aforesaid that freezes product with a minimum of cellular breakdown by reason of a short freezing period, to provide more flavor, less liquid loss, less shrinkage and better color.

A further object of our invention to provide a process of the nature aforesaid that, particularly in the case of meat, provides a product with better bloom and less shrinkage than that produced by either mechanical or gas freezing systems individually.

A further object of our invention to provide a process of the nature aforesaid that eliminates substantial amounts of bacteria and other micro-organisms commonly associated with product frozen by other processes.

A further object of our invention to provide a process of the nature aforesaid that is more economical than liquified gas freezing, and compares favorably, economically, with mechanical freezing.

A still further object of our invention to provide apparatus for carrying out the process aforesaid that has appropriate control and safety features.

A still further object of our invention to provide both process and apparatus of the nature aforesaid that is new and novel and otherwise well adapted to the purpose for which it is intended.

These and other objects of our invention will become apparent from consideration of the following specification and accompanying drawings. In carrying out the objects of our invention, however, it is to be understood that its essential features are susceptible of change in design, ordering and structural arrangements, with only one preferred practical embodiment being illustrated, as required.

In the accompanying drawings, wherein like numbers of reference refer to similar parts throughout:

FIG. 2 is an electrical circuit diagram of the various parts of our invention, embodying normal symbology.

FIG. 3 is a partial isometric cutaway view of the pressure vent door of our invention, looking obliquely from the outside.

FIG. 4 is a partial orthographic, cross-sectional view of the door of FIG. 3, taken on the line 4—4 thereon in the direction indicated by the arrows.

Figure 1:
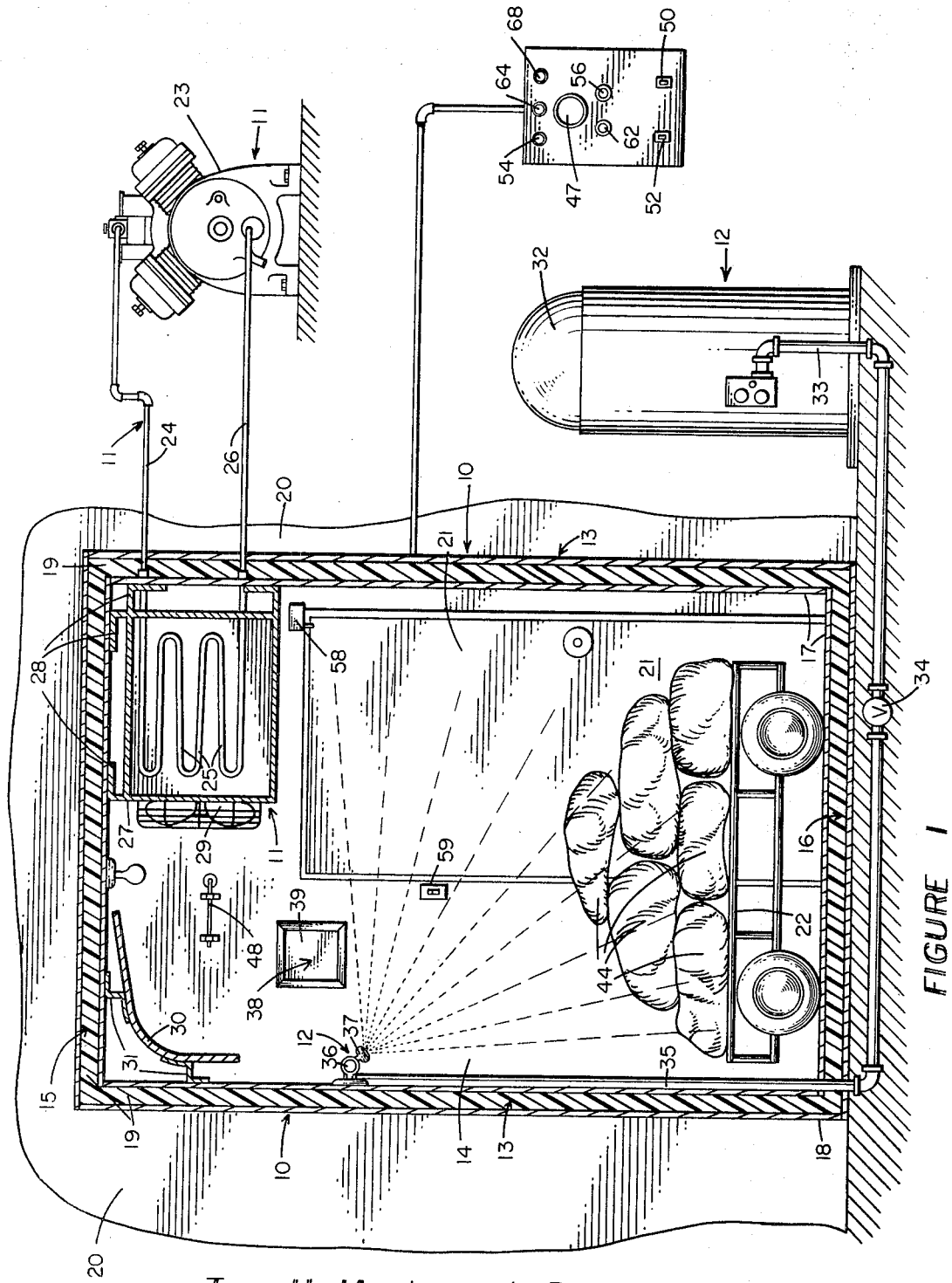
FIG. 1 is a cutaway, semi-diagrammatic, orthographic view of a refrigeration room embodying our invention, together with its ancillary apparatus.

Referring now more particularly to the illustrations, and especially to that of FIG. 1, it will there be seen that our invention includes an insulated freezing chamber 10 provided with an ordinary mechanical conduction type refrigeration system 11 and a liquid gas type refrigeration system 12, each with appropriate auxiliary structures and controls.

Freezing chamber 10 is defined by paired, opposed side walls 13 structurally communicating with end walls 14, each cooperating to support top 15 and in turn being supported by bottom 16. These members are formed with a structurally rigid inner surface 17 and outer surface 18, separated at a spaced distance by thermal insulation 19 carried therebetween. This member has the purpose only of defining a freezing chamber and providing support for appurtenant structures, so the details of its construction are not critical.

The efficiency of our process is regulated to a degree by thermal conductivity through the freezing chamber walls and the insulation therein should therefor be as great as reasonably possible. In many structures it is also possible to locate a freezing chamber 10 in a holding freezer room 20 so that the temperature about most of the outer peripheral surface of the freezing chamber will be at the temperature of the holding freezer, generally some several degrees below zero. This arrangement, if it can be obtained, is advantageous though obviously not necessary to the functioning of our invention.

An access door 21 is provided in one of the vertical walls 13, 14 and hingably supported therein to provide access to the interior chamber; preferably the door should be so located and dimensioned as to allow access therethrough of conventionally used wheel pallets 22 common in the food processing industries. The structure of the door as to thermal properties, should be similar to that of the walls and the communication of the door with its opening should also be such as to prevent excessive heat transfer. These structures are not critical to our invention and are well known in the cryogenic arts.

Mechanical refrigeration system 11 includes compressor 23 communicating by pressure lead 24 to expansion coil 25, thence through vacuum lead 26 to return to the compressor. Compressor 23 is of the ordinary construction of commerce and positioned at some convenient location external to freezing chamber 10. Coil housing 27 is structurally carried by brackets 28, communicating with the top and side wall of freezing chamber 10. The housing is located at a spaced distance from the wall and provided with forward fans 29 to cause a forced circulation of air in the freezing chamber through and about expansion coil 25. Preferably coil housing 27 and expansion coil 25 are relatively elongate structures to provide a substantial heat transfer area, and if this be so, the structure normally should be provided with a plurality of fans 29. This type of heat transfer unit is again well known in the art and commercially available.

Rolled deflector 30 is provided on side wall 13 opposite coil housing 27, faced inwardly as illustrated, to deflect air presented thereto in substantially a horizontal fashion by fan 29 to a downward course to more directly and intimately communicate with product in the lower portion of the chamber without excessive turbulance in the chamber corners. This deflector is preferably an elongate member of cross-sectional shape illustrated in FIG. 1 and should extend substantially the length of the freezing chamber. It is carried by appropriately shaped brackets 31 supported by the peripheral walls of freezing chamber 10. This member serves the further purpose of directing the mechanically cooled air presented to it in a reasonably coherent stream over the gas ejection heads located therebelow.

Liquid gas refrigeration system 12 includes the external pressurized liquid gas supply container 32 communicating by inlet conduit 33 to control valve 34, thence by conduit 35 to spray head divider 36 and thence to spray heads 37. The spray head divider is an elongate member adapted to carry a plurality of spray heads 37 at spaced distances therealong throughout the length of the freezing chamber. The spray heads direct a relatively fine spray of liquid gas presented thereto into a maximum or substantial portion of freezing chamber 10 and they should be physically located below deflector 30 so that air deflected thereby will move through the spray produced by these heads to become intermixed therewith and moved thereby for circulation through the freezing chamber. Because of the extreme low temperature of liquid gas relative to its surroundings, the various gas conduits outside freezing chamber 10 should be insulated to prevent excessive heat transfer therefrom.

With liquified gas being passed into freezing chamber 10 and expanded therein, provision must be made by pressure-activated outlet vent 38 to prevent excessive pressure of gas within the freezing chamber. This outlet vent in FIG. 3 is seen to include planar gate flap 39 shaped and dimensioned to cover outlet orifice 40 and pivotably supported thereover by piano hinge 41 along one peripheral edge, preferably top 42, so that gravity may be used to aid in closing the gate if necessary. Strips of magnetic material 43, preferably carried upon pressure sensitive adhesive tape, are placed about the periphery of outlet orifice 40 abutting the inner surface of flap 39. The amount or length of this tape may be regulated to in turn regulate the magnetic force tending to hold flap 39 shut so as to provide an upper limit pressure release gate. With this structure obviously the material from which flap 39 is constructed must be magnetically permeable or some magnetically permeable material associated with the flap. With chamber pressures of approximately five pounds above that of the atmosphere, at which we prefer to operate our process, we have found this structure to be quite satisfactory and economic.

Since most of the inert gases used in our process are deleterious to humans, outlet orifice 40 should be vented to an area where its output would not endanger humans or else its discharge sufficiently mixed with air to render it not deleterious.

The floor of freezing chamber 10 is flat and appropriately related to its surroundings to allow locomotion of ordinary wheel pallets 22 through the door 21 and thereover. Such pallets most conveniently carry product 44 to be frozen. This product preferably is packaged or disposed on the pallets in such fashion that it has maximum surface area exposed to contact with the atmosphere in freezing chamber 10. Various methods of disposing the product in such fashion have heretofore become well known, although random loose stacking is fairly effective.

The electronic circuitry of our invention is best known in the diagrammatic illustration of FIG. 2. It comprises an alternating current circuit having entrance leads 45 and 46. Shunted between these leads is continuous recording thermometer 47 having a thermocouple type sensing mechanism 48 located within freezing chamber 10. Lead 46 communicates through fuse 49 to master off-on switch 50. From this switch lead 51 thence communicates in series with mechanical refrigeration switch 52, thence by lead 53 in series through operation light 54 and thence by lead 55 back to entrance lead 45. In series with lead 51 and in parallel with mechanical refrigeration switch 52, is pushbutton-type reset switch 56, which communicates by line 57 in series through door switch 58, emergency switch 59 and high pressure cutoff switch 60, and thence through lead 61 ultimately back to solenoid reset switch 62.

Line 63 communicates from line 53 in series through reset light 64, thence through line 65 to temperature control switch 66 and thence through line 67 to the coil of gas valve 69 and back to entrance lead 45. Gas operating light 68 is shunted between lines 65 and 67 to indicate when the gas valve 69 is operating to allow gas to flow into freezing chamber 10. The coil of solenoid reset switch 62 is shunted between entrance lead 45 and lead 65, as illustrated.

A time activated clock switch 70 is shunted between imput lead 46 and line 57, as indicated, to provide current for predetermined intervals through leads 71, 72 to the coil of gas valve 69, to maintain an inert gas atmosphere in the freezing chamber during the entire freezing process. It is to be noted that with this circuitry gas will not be supplied by the valve 69 unless all of the various safety switches 58, 59, 60 are inactive and in normally closed condition.

With this structure in mind, the freezing process of our invention may be described and the operation of the various apparatus will more fully appear.

Product to be frozen 44 is established in appropriate sized pieces or containers and placed upon pallets 22 so that a major portion of the surface of each piece of product is exposed to the surrounding atmosphere. The product is then moved on the pallets into freezing chamber 10 through access door 21. The chamber is closed and the freezing process instituted.

The initial freezing stage, until the average gaseous temperature within freezing chamber 10 reaches approximately thirty degrees, is provided by mechanical refrigeration system 11. When the temperature of approximately thirty degrees is reached, the product will be in a condition about to freeze but will not usually have begun to freeze, as normally its freezing temperature is slightly below that of water.

At this point the liquid gas system is activated to freeze the product to solid state rapidly. It is used in cooperation with the mechanical unit to lower the average gaseous temperature in the room from thirty degrees Fahrenheit to approximately minus forty degrees Fahrenheit.

The liquid gas system is controlled thermostatically by switch 66, which is predetermined to activate at approximately thirty degrees Fahrenheit and continue in activation to approximately minus forty degrees Fahrenheit. During this operative period the switch is closed to open gas valve 67 and allow liquid gas to enter freezing chamber 10 through spray heads 37. From the electrical circuitry described, it is to be noted that mechanical refrigeration switch 52 must be in closed operative position to allow the gas thermostat switch 66 to open gas valve 67. This circuitry then requires as a condition precedent to operation of the gas refrigeration system the concurrent operation of the mechanical refrigeration system.

In normal operation, the door switch 58, emergency switch 59 and high pressure cut-out switch 60 are all in closed position but should any of them activate by opening, the activation will cause a stoppage of the entire gas system and an activation of the solenoid reset switch coil; if this solenoid reset switch 62 be activated, the system can then again be put into operation only by closing the appropriate safety switch 58, 59, 60 and activating pushbutton reset switch 56, after correcting the difficulty.

It is desirable during the entire freezing process that an inert gas atmosphere be maintained in the freezing chamber to reduce oxygen which may harm the product and to reduce water vapor which may frost mechanical refrigeration coils. The clock time switch 70 accomplishes this objective by providing short spaced bursts of gas by activating gas valve 69 in predetermined cycle, unless prevented by the safety switches.

Operation light 54 will indicate when the circuit is in operation; reset light 64 will indicate when the system is in condition requiring reset for operation; and gas operating light 68 will indicate when gas valve 67 is open allowing nitrogen to enter the freezing chamber.

During the freezing process if pressure rises above the predetermined maximum point, approximately five pounds, outlet vent 38 will open to relieve the pressure to the maximum point so that proper gas expansion conditions will be present.

The use of the inert gas freezing process is limited to the ranges specified because they define the period during which it is most useful, necessary, and economical. The time involved in lowering product temperature near the freezing point does not appear to be particularly critical in food processing, so long as it is not unreasonably long; mechanical refrigeration is quite effective and most economical in this range. Most cellular changes apparently take place in the product near the freezing point and at the time freezing takes place; this period is therefore critical and it is desirable at this time that the freezing point be crossed over rapidly so that the product comes to a solid frozen state quickly and does not remain in a regulation condition for any extended period. The more rapidly the freezing point is passed, also, the smaller the solid crystals produced in the product on freezing and the less the damage done thereby.

After the initial freezing is obtained, less energy is required to further reduce the temperature of the product and it is not particularly material how rapidly the lowering of temperature continues. Therefore, after freezing, the mechanical refrigeration is used because of its greater economy. With the ordinary mechanical refrigerants presently in use, it is not too practical to obtain temperatures much below minus sixty degrees Fahrenheit and this seems to be a quite satisfactory minimal end point.

During the entire freezing process an inert gas atmosphere should be present, though obviously it is most beneficial before solid freezing. The cycling of gas imput should be regulated in a particular installation to maintain this inert atmosphere with a minimum cost.

The particular temperature ranges previously set forth have been found to be suitable to our process in freezing meat in loosely assembled packages ranging in weight from ten to fifty pounds. Various products, packaged in differing fashions, will require slightly different temperatures ranges for most beneficial and economical operation of our process and we, therefore, prefer to keep continuous records of freezing curves of such various products, by means of continuous recording thermometer 47, so that this data may be tabulated and maxima product desirability and minima cost determined from it by well known mathematical methods. It is essential to our process, however, that the mechanical refrigeration be used to bring chamber temperature very near the freezing point of the particular product and that at this point liquid gas freezing be applied to very quickly bring product temperature below its freezing point and into a temperature range in the neighborhood of minus thirty degrees Fahrenheit so that the entire product is frozen. The exact beginning and end points of the gas refrigeration should be determined by a determination of the minima of the ratio of cost of gas refrigeration to cost of mechanical refrigeration, within the aforesaid physical limits, as aforesaid.

In carrying out our process, we presently prefer to use liquid nitrogen as an inert gas. It is conveniently obtainable as a by-product of the oxygen industry and its low temperature of liquification and inert nature admirably suit the purposes of our invention. Obviously, however, other gases having similar properties might well be used.

From the foregoing description, it is to be noted that during the principal freezing process, all or substantially all of the atmosphere in the freezing chamber is inert gas and, therefore, there is quite small partial pressure of water vapor so that icing of the mechanical refrigeration coils is substantially eliminated.

It is further to be noted that since inert gas is used within the freezing chamber and freely circulated thereabout, this atmosphere would be dangerous to humans. To prevent accident, the door switch 58 automatically terminates gas imput when the door is opened and the process cannot be reactivated except through activation of a reset switch which is physically located on the outside of the freezing chamber. As an additional precautionary measure, emergency switch 59 is placed within the freezing chamber and pressure switch 60 and pressure outlet vent 38 limit the pressure that may be maintained within the chamber.

It is further to be noted that by reason of the rapid freezing of the product and the maintenance of an inert gas atmosphere in the freezing chamber during the process, there is substantially less shrinkage in frozen product caused by evaporation or sublimation of moisture therefrom.

It is further to be noted that both the inert gas and low temperatures involved in the process tend to aid in destroying bacteria and other micro-organisms, especially of the aerobic type, that might be in or about the product.

It is to be understood that the foregoing description is necessarily of a detailed, specific character so that a specific embodiment of our invention might be set forth as required, but it is to be understood that various modifications, changes and multiplication of parts and substitution in and ordering of processes may be resorted to without departing from the spirit, essence or scope of our invention.

Having thusly described our invention, what we desire to protect by Letters Patent and

What we claim is:

1. The cryogenic process of the nature aforesaid, comprising:
    firstly establishing product to be frozen in a freezing chamber;
    secondly lowering the product temperature near the freezing point of such product substantially by mechanical refrigeration;
    thirdly rapidly lowering the product temperature by liquid gas refrigeration and mechanical refrigeration to substantially below the product freezing point until the product is substantially frozen; and
    fourthly lowering the product temperature to the desired minimal terminal point substantially by mechanical refrigeration.

2. The invention of claim 1 wherein the liquid gas refrigeration is obtained by spraying liquid gas into the freezing chamber while maintaining a turbulent atmosphere and a relatively low gas pressure therein.

3. The cryogenic process of the nature aforesaid, comprising:
    establishing the product to be frozen in a freezing chamber;
    lowering the average temperature of the atmosphere in the chamber near the freezing point of the product substantially by mechanical refrigeration;
    thereupon rapidly lowering the average temperature of the atmosphere in the chamber by a combination of mechanical refrigeration and inert liquid gas refrigeration to substantially below the product freezing point until the product is substantially frozen; and
    lowering the average temperature of the atmosphere in the chamber to the desired minimal terminal point substantially by mechanical refrigeration.

4. The process of claim 3 wherein an inert gas atmosphere is maintained in the freezing chamber during the freezing process.

5. The process of claim 3 wherein said liquid gas freezing is maintained substantially between the temperature range of thirty degrees Fahrenheit and minus forty degrees Fahrenheit.

References Cited

UNITED STATES PATENTS

| | | | |
|---|---|---|---|
| 3,125,867 | 3/1964 | Rath | 62—332 X |
| 3,250,630 | 5/1966 | Webster et al. | 62—64 X |
| 3,294,553 | 12/1966 | Benson | 99—193 |
| 3,385,075 | 5/1968 | Casale | 62—63 |
| 3,405,531 | 10/1968 | Davis et al. | 62—64 X |

WILLIAM E. WAYNER, Primary Examiner

U.S. Cl. X.R.

62—332, 373